(No Model.) 6 Sheets—Sheet 2.
P. W. LEFFLER.
ELECTRIC RAILWAY.

No. 514,561. Patented Feb. 13, 1894.

Witnesses.
A. H. Opsahl.
Mark D. Merchant,

Inventor.
Paul W. Leffler
By his Attorney.
Jas. F. Williams (No Model.)

P. W. LEFFLER.
ELECTRIC RAILWAY.

No. 514,561.

6 Sheets—Sheet 3.

Patented Feb. 13, 1894.

Witnesses.
A. H. Opsahl.
Frank D. Merchant,

Inventor.
Paul W. Leffler
By his attorney.
Jas. F. Williamson (No Model.) 6 Sheets—Sheet 4.
P. W. LEFFLER.
ELECTRIC RAILWAY.

No. 514,561. Patented Feb. 13, 1894.

Witnesses.
A. H. Opsalit.
Frank D. Merchant.

Inventor.
Paul W. Leffler
By his Attorney.
Jas. F. Williamson (No Model.)  
P. W. LEFFLER.  
ELECTRIC RAILWAY.
No. 514,561.  Patented Feb. 13, 1894.
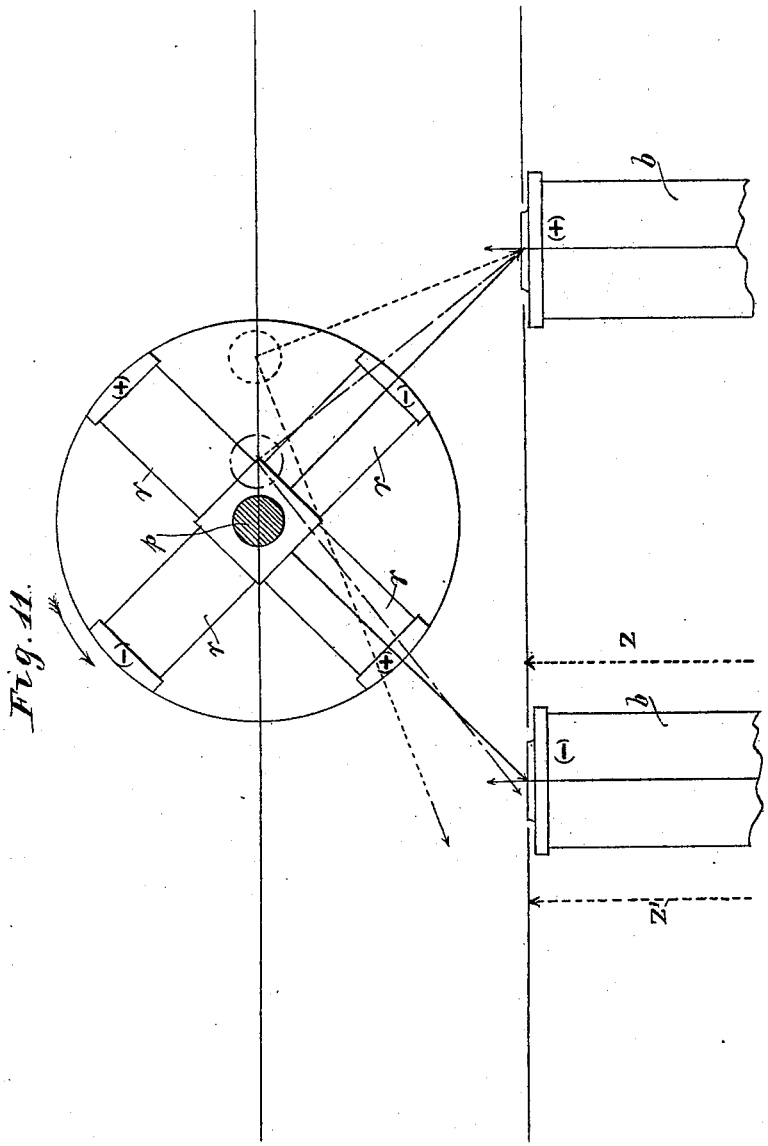
Witnesses.
A. H. Opsahl.
Frank D. Merchant.
Inventor.
Paul W. Leffler
By his Attorney.
Jas. F. Williamson (No Model.) 6 Sheets—Sheet 6.
P. W. LEFFLER.
ELECTRIC RAILWAY.
No. 514,561. Patented Feb. 13, 1894.
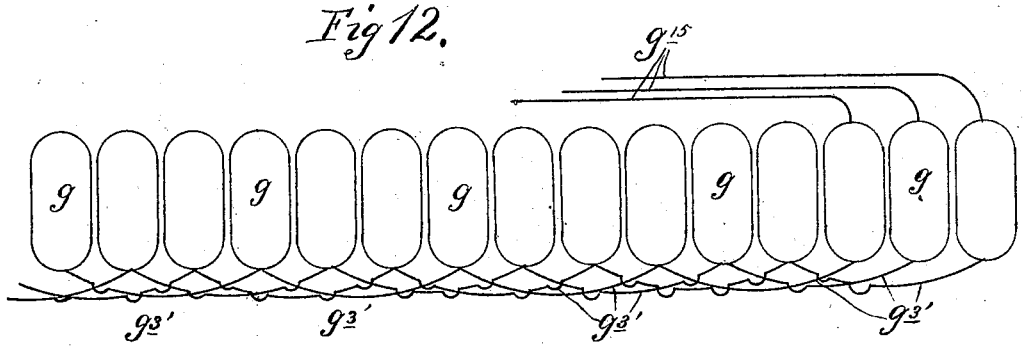
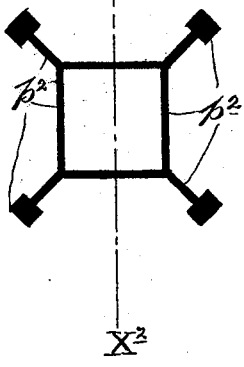
Witnesses
A. H. Opsahl.
Frank D. Merchant,
Inventor.
Paul W. Leffler
By his Attorney.
Jas. F. Williamson

UNITED STATES PATENT OFFICE.

PAUL W. LEFFLER, OF MINNEAPOLIS, MINNESOTA, ASSIGNOR TO THE LEFFLER ELECTRO MAGNETIC RAILWAY COMPANY, OF CHICAGO, ILLINOIS.

ELECTRIC RAILWAY.

SPECIFICATION forming part of Letters Patent No. 514,561, dated February 13, 1894.

Application filed May 13, 1893. Serial No. 474,098. (No model.)

*To all whom it may concern:*

Be it known that I, PAUL W. LEFFLER, a citizen of the United States, residing at Minneapolis, in the county of Hennepin and State of Minnesota, have invented certain new and useful Improvements in Electric Railways; and I do hereby declare the following to be a full, clear, and exact description of the invention, such as will enable others skilled in the art to which it appertains to make and use the same.

My invention relates to electric railways, of the kind shown and described, in my pending application, Serial No. 452,799, filed of date November 22, 1892; and has for its object to provide certain improvements in the said system, with a view of simplification and increased efficiency.

The invention is especially directed to the mechanism for changing the polarities of the several coupled series of magnets constituting the non-rotating armature carried by the car; and it consists broadly in a rotary pole changer operated by the field magnets, and serving to change the polarity of the said several coupled series of armature magnets in succession. This rotary pole changer is composed of a commutator located in the connections to said armature magnets, and a magnetic controller operated by the field magnets and driving the commutator.

The specific construction of the device will be hereinafter fully described.

The novel features of the invention will be defined in the claims.

My invention is illustrated in the accompanying drawings, wherein, like letters referring to like parts throughout the several views—

Figure 1:
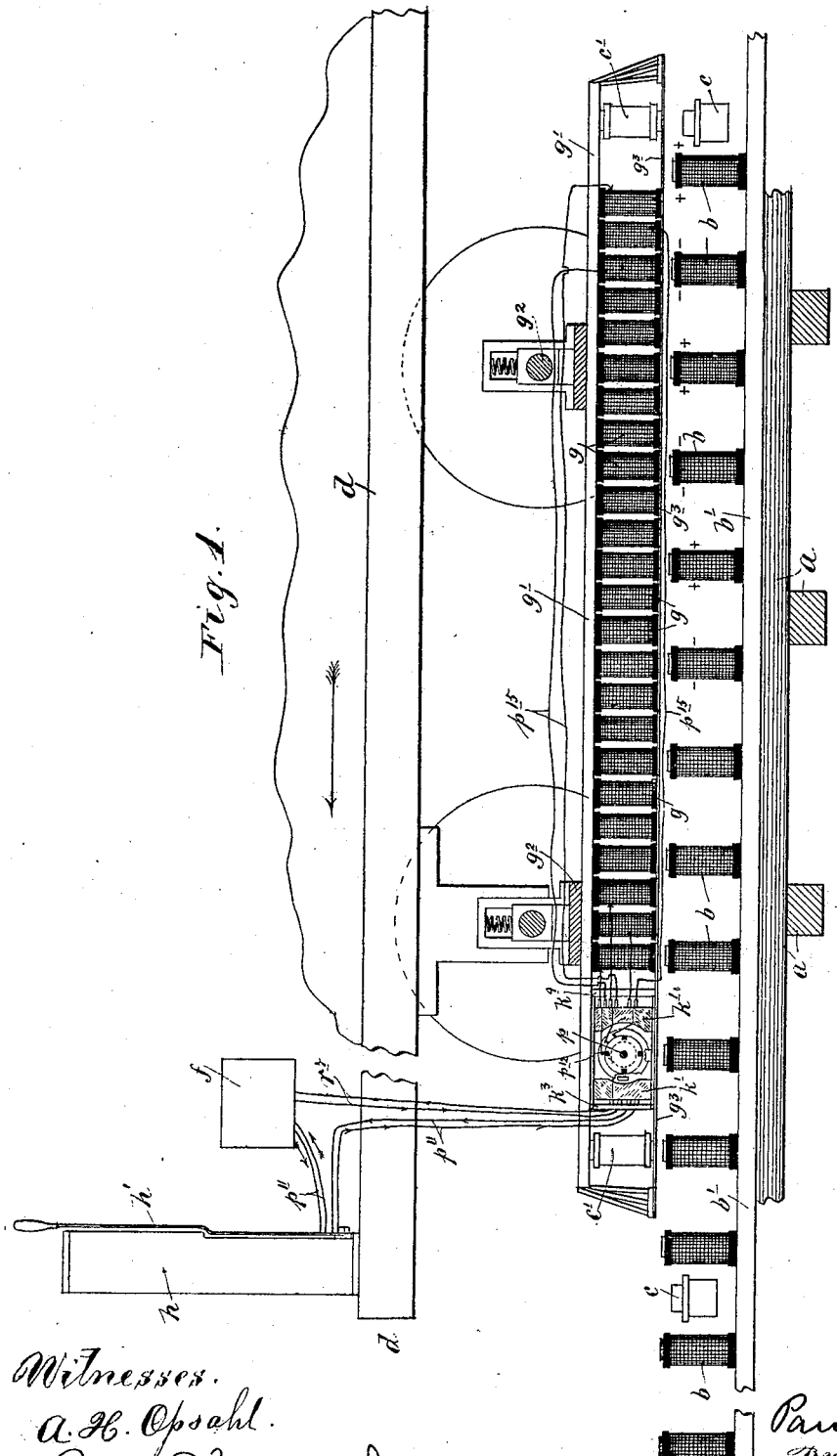
Figure 2:
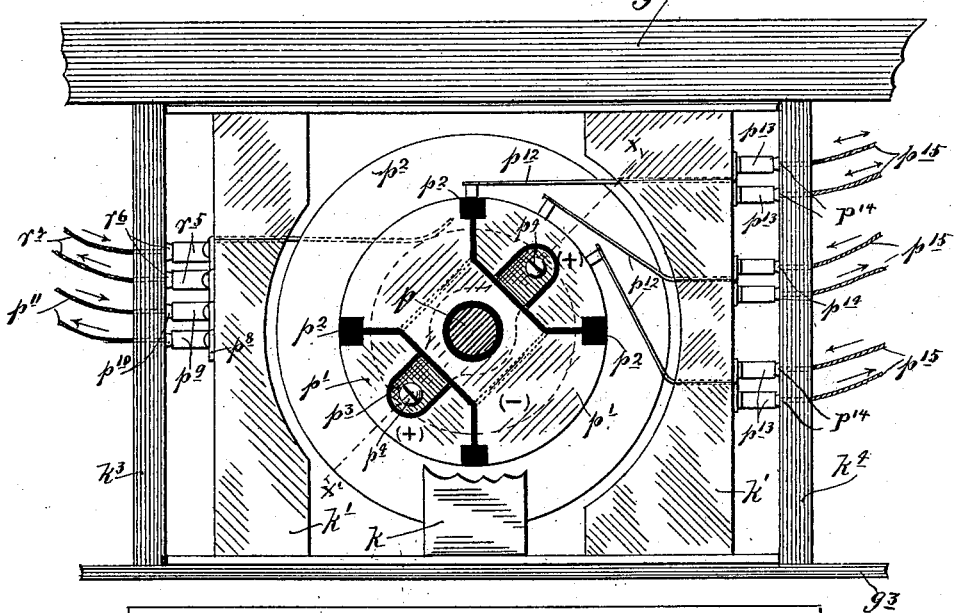
Figure 3:
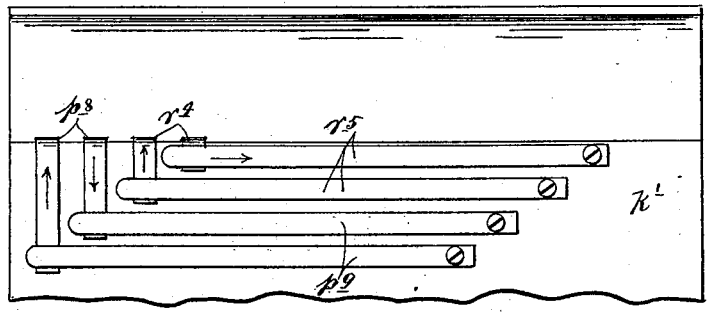
Figure 4:
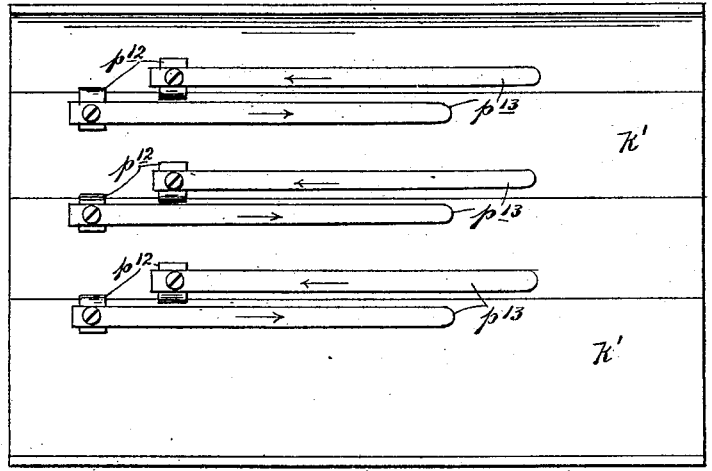
Figure 5:
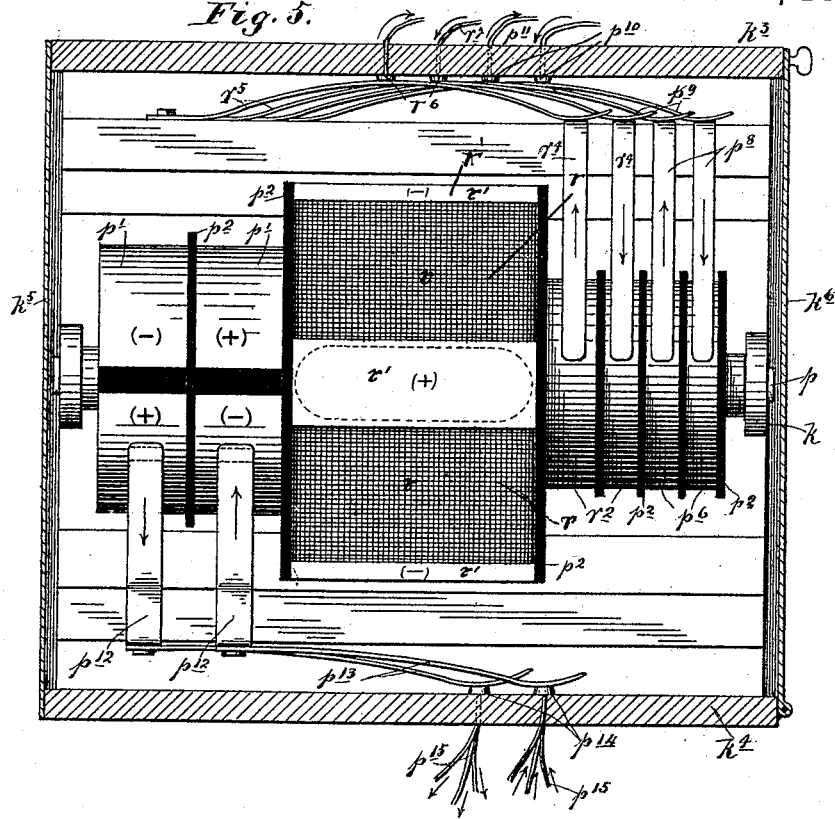
Figure 6:
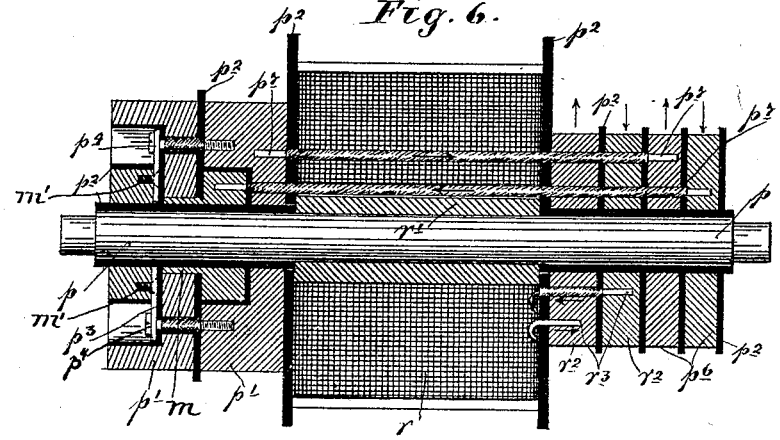
Figure 7:
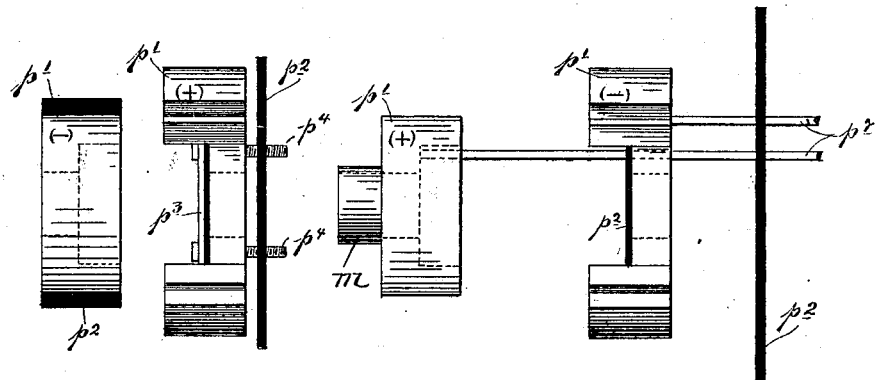
Figure 8:
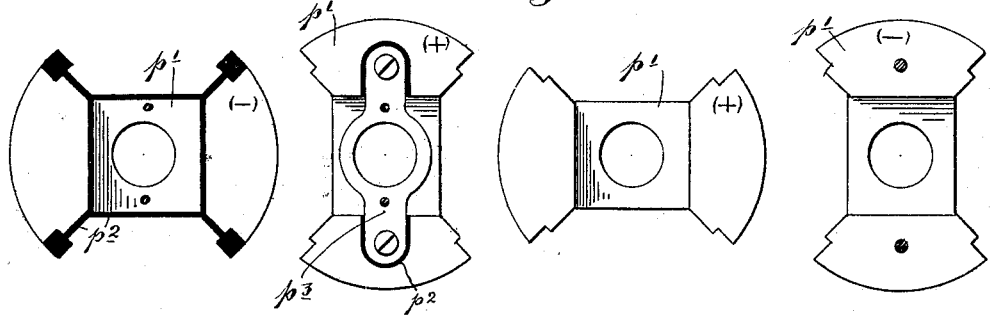
Figure 9:
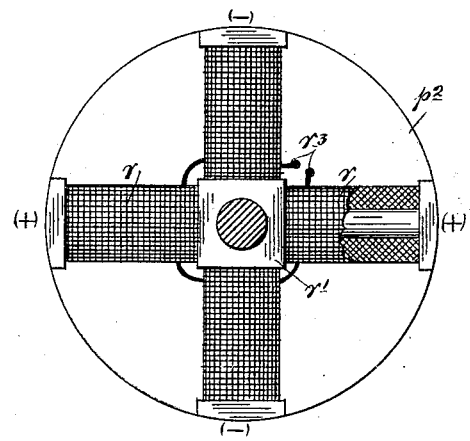
Figure 10:
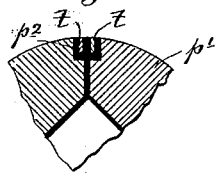

Figure 1 is a view in left side elevation, some parts being removed and others shown in diagram only, illustrating a car, as equipped with my improvement. Fig. 2 is a left side elevation of the rotary pole changer in its seat, on a part of the car detached, and shown on a larger scale than in Fig. 1. Fig. 3 is a detail in front elevation of the brushes and contact pieces, shown at the front end of Fig. 2. Fig. 4 is a detail in rear elevation of the brushes and contact pieces shown at the rear of Fig. 2. Fig. 5 is a plan view of the rotary pole changer detached, with some parts of its frame removed. Fig. 6 is a longitudinal vertical section of the rotary pole changer detached, on the line X X' of Fig. 2, the frame being removed. Fig. 7 is a detail in elevation, showing the parts of the commutator spread apart from each other. Fig. 8 is a view of the pieces, shown in Fig. 7 opened up and laid down flatwise, with their engaging surfaces uppermost. Fig. 9 is a detail, showing the magnetic controller detached, the supporting shaft being shown in section, and some of the parts removed. Fig. 10 is a detail in cross section, showing a modified form of the insulation between the pole pieces of the commutator. Fig. 11 is a diagram view, showing the relations of the magnets of the field, and the magnetic controller. Fig. 12 is a diagram view illustrating the manner in which the magnets of the non-rotating armature, are connected up in series. Fig. 13 is a detail in end elevation of one of the insulating partitions $p^2$, which separates the interlocking edges of the pairs of interlocking terminal pieces $p'$ from each other; and Fig. 14 is a vertical section of the same, taken on the line $x^2 x^2$ of said Fig. 13.

$a$ represents part of the field magnet conduit, the other parts being removed.

$b$ represents the field magnets rising from the common soft metal base plate or yoke $b'$, resting on the floor of the conduit. The adjacent members of the field magnets $b$ are so wound, that they will be of opposite polarity. The said field magnets are in electrical connection, with a source of electricity at the central station or elsewhere, by means not shown.

$c$ represents magnetic switch boxes located in the line of travel, and which co-operate with switch magnets $c'$, carried by the car $d$. For the purposes of the case the functions of these magnetic devices, $c$ and $c'$, need not appear, as the same form no part of my present invention.

$g$ are magnets depending from the yoke or base plate $g'$, which parts, taken together, constitute the non-rotating armature carried by the car and moving in the field of the magnets $b$. The said non-rotating armature is carried by spring seated hangers $g^2$, depending from the car-axles. The yoke-plate $g'$ is extended beyond the magnets $g$ at each end, for co-operation with the brass facing strip $g^3$, to form seats for some of the other operative parts of the mechanism. The armature magnets $g$ are arranged and connected up in several coupled series. The manner in which these magnets $g$ are coupled up in series, is illustrated in diagram in Fig. 12, in which figure $g^3$ represents the coupling wires. The arrangement of the said armature magnets $g$, with respect to the said field magnets $b$, is such, that the forces of attraction and repulsion will co-operate to propel the car in a common direction. When the car is in motion, the said armature magnets $g$ are constantly in circuit with the storage battery $f$, through a combined regulating and reversing device $h\ h'$ and my improved rotary pole changer, which will be presently described.

The combined regulating and reversing device $h\ h'$, is shown in diagram only, the part $h$ representing the box, on the end of the car, containing the resistance and reversing contacts, and the part $h'$ representing the single hand lever, for controlling the same.

All the parts so far noted, with the exception of the rotary pole changer, are substantially identical with the construction fully set forth and described in my hereinbefore identified pending application; and any further detailed description of the same is not deemed necessary, for the purposes of this case.

The field magnets $b$ are, as hitherto intimated, excited, when in circuit, with a constant polarity, as indicated by the signs (+ —) on the drawings. Hence, for the successful operation of my system, it is necessary to change the polarities of the several series of armature magnets $g$, on passing the dead centers with the field magnets $b$. My improved device for this purpose will now be described, attention being first given to the commutator. In bearing lugs $k$ of a frame $k'$ is journaled a shaft $p$, which carries the parts of the rotary pole changer. On the shaft $p$ and insulated therefrom are mounted, side-by-side, four double segmental terminal pieces or plates $p'$. All four of these double segments are cut away at their central portions, as clearly shown in Figs. 7 and 8. When put together on the shaft $p$, the two central members of said plates $p'$ have socket and socket-seat engagement, as shown at $m$, and are insulated from each other at all other points; and each of the said central members interlocks with the adjacent outside member and is insulated therefrom, at all points. When thus put together, the two sets of interlocked members will form a pair of cylinders, the adjacent peripheral segments of which, lengthwise of the shaft $p$, form the co-operating contact surfaces for the commutator-brushes, as will more fully hereinafter appear. The inner pair of said terminal pieces $p$, have electrical contact, at the point of their socket and socket-seat engagement $m$. The outer pair of said terminal plates $p$ have contact through a yoke-piece $p^3$, secured to and in electrical contact with one of said outer pieces, by the screws $m'$, and connected with the other of said outer pieces by screw-bolts $p^4$, passing through and insulated from one of the inner members, as clearly shown in Fig. 6. The yoke-bar $p^3$ is also insulated from the said inner member, against which it is clamped by the bolt-screws $p^4$. At all other points than those named, the several terminal plates $p'$ are insulated from each other, and from the shaft $p$, by suitable insulating material $p^2$. Otherwise stated, the central members have electrical contact only at their socket and socket-seats $m$, and the outer members of said plates $p'$ have electrical contact only through the bolt-screws $p^4$, yoke-plate $p^3$ and screws $m'$. It is therefore obvious, that the inner pair of said plates will be like terminals, marked in the drawings as the positive plates, and that the outside members, which interlock respectively, each with one of the inner members, will also be like terminals, marked in the drawings as the negative plates.

The relative arrangement of the insulating material $p^2$, when the parts are assembled is clearly shown in Fig. 6. Between each interlocking pair of the said terminal plates $p'$, to-wit: between each central member and the adjacent outside member is placed a body of insulating material $p^2$ of the shape shown in Figs. 13 and 14, which is there shown detached from the pair of interlocking plates, shown at the right in Fig. 8. A similar body of insulating material $p^2$ is shown in position, with respect to the left hand outside terminal plate, at the left side of Fig. 6. These bodies of insulating material $p^2$ are made of the proper shape and are properly disposed, to permit the said terminal plates $p'$ to be put together into working position, as hitherto described, and as clearly shown in Fig. 6, and to insulate the same from each other, at all points, except those hitherto noted, where the necessary electrical contacts are made between the pair of outside members and the pair of inside members.

It is obvious, that the yoke-bar $p^3$ and bolt-screws $p^4$ not only serve to give the contact stated, between the outer pair of said terminal pieces $p'$, but also serves to clamp and hold together all four of the said double segmental terminal plates $p'$. The said terminal plates $p'$, arranged as just described, when taken together with the conductors for supplying the current thereto and the brushes, (hereinafter to be noted) for co-operation with said pieces, constitute a commutator, for alternating the currents through the armature magnets $g$ and changing the polarities of the same. The said commutator is rigid with the shaft $p$ and is driven by a magnetic controller also rigid with the said shaft, and consisting as shown, of four radial magnets $r$ on corresponding spokes of a star-wheel $r'$. The adjacent members of the magnets $r$ of this controller, are of opposite and constant polarity. This magnetic controller is located on the shaft $p$, abutting against but insulated from the commutator above described. To the right of the controller on said shaft $p$, and insulated therefrom and from each other, are located four contact disks $r^2$ and $p^6$. All the insulations for the commutator and the controller are marked with the common letter $p^2$. The controller magnets $r$ are wound with a common wire $r^3$, the terminals of which connect with the contact disks $r^2$. The terminal pieces $p'$ are connected by cross rods $p^7$ with the contact disks $p^6$. These connections are insulated wherever required, as clearly shown in Fig. 6 of the drawings. The contact disks $r^2$ connect by brushes $r^4$ and spring contacts $r^5$ on the frame $k'$ with contact buttons $r^6$, having connection through wires $r^7$ with the storage battery $f$. The contacts $p^6$ connect by brushes $p^8$ with spring contacts $p^9$, which connect with contact buttons $p^{10}$ united by wires $p^{11}$, through the reversing and regulating device $h$ $h'$, with the said storage battery $f$. The terminal pieces of the commutator connect by three pairs of co-operating brushes $p^{12}$ and corresponding spring contacts $p^{13}$, with corresponding buttons $p^{14}$ connected by wires $p^{15}$, with the several series of coupled magnets $g$ of the non-rotating armature on the car.

The contact buttons $r^6$ and $p^{10}$, which form the terminals of the wires $r^7$ and $p^{11}$ from and to the storage battery $f$, are located in a vertical board $k^3$, held between the yoke-bar $g'$ and the strip $g^3$; and the contact buttons $p^{14}$, forming the terminals of the wires $p^{15}$ through the coupled series of armature magnets $g$, are carried on a similar vertical board $k^4$, also held between the yoke-bar $g'$ and the strip $g^3$, at their forward extensions. The said boards $k^3$ and $k^4$ are spaced apart from each other, and taken together with the yoke-bar $g'$ and the strip $g^3$ form a seat for the pole-changer-frame $k'$. The said frame is removable from the said seat; and in virtue of the arrangement of the said contacts and contact-buttons, when the frame is inserted in position, all the said parts will be in operative contact. This is due to the fact that the spring contacts $r^5$, $p^9$, and $p^{13}$ are engaged by the side boards of the seat, and forced into engagement with their respective contact pieces. The said pole changer frame is held in position against a left end plate $k^5$ (brass), by a pivoted door (brass) $k^6$, at the right end of said seat.

The pole changer frame $k'$, is composed of suitable insulating material, such for example, as wood fiber or wood, and the brushes $p^{12}$ pass through the same at different levels, and have contact with the terminal pieces in advance of each other, as shown in Fig. 2. Each co-operating pair of brushes $p^{12}$ are side by side in adjacent lateral arrangement, and on opposite sides of the projecting plate $p^2$ working on the co-operating segments of the laterally arranged terminal pieces $p'$.

With the construction described, it is obvious, that the magnets $r$ of the controller, are always in circuit, so far as the connections described are concerned, with the storage battery $f$, and will be excited with a constant polarity. It is also obvious, that the currents through the several series of the armature magnets $g$, will be reversed every time, that the brushes $p^{12}$ pass from one pair of the peripheral segments of the terminal plates $p'$ to the next contiguous pair of said peripheral segments. The three pairs of co-operating brushes $p^{12}$ are all arranged within the arc of one segment of the circle formed by the terminal pieces. Hence, the alternations will take place in regular order, as 1, 2, 3 and 1, 2, 3. Hence, in virtue of this fact, to secure the alternations in equal intervals of time, the said pairs of brushes are arranged in the first three quarters of the segment, and at equal distances apart. Supposing the car to be in motion, the magnetic controller will be kept constantly revolving by the field magnets. Hence, the commutator, carried on the same shaft therewith, will keep alternating the current, through the several coupled series of the armature magnets $g$, thereby changing the polarities of the same as required.

Having regard to the relation of the field magnets $b$, and the magnets $r$ of the magnetic controller, it is necessary for the proper action, that the outer ends of the controller magnets $r$ should be spaced apart distances shorter than the distances or spans between the centers of adjacent field magnets. The proper relation of these parts, may be stated as follows, to-wit:—If the axis of the controller be at a point midway between two adjacent field magnets, then the span between the said two field magnets will form the base line, and the axes of the radial controller magnets, produced, will form the legs of an isosceles triangle, the altitude of which is equal to the height or vertical distance of the axis of the controller from the face of the field magnets. In other words, the axial lines of the controller magnets, produced, would strike the face centers of the said adjacent pair of field magnets. This construction and arrangement of the said parts causes the lines of force to operate in the proper directions, for utilizing the maximum power of the magnets and for giving an equable motion to the said controller and commutator driven thereby.

Referring to the diagram view, Fig. 11, the full lines show the controller with its axis at the central or midway position between two adjacent field magnets, together with the directions of the axial lines of force from the field to the lower pair of the controller magnets.

The dotted lines, show two of the intermediate positions assumed by the controller, in passing from one field magnet to the other, together with the axial lines of force from the lower pair of said controller magnets to the said field magnets, when in said intermediate positions. If the field magnets should be improperly spaced, with respect to the controller magnets, the motion of the controller, would be irregular. Suppose, for example, that one of the adjacent pair of field magnets $b$, should be in the position shown by the dotted line $z$. From an inspection of the indicated lines of force, on Fig. 11, it is obvious that an accelerated motion would be given to the controller. If the field magnets $b$, had been spaced too wide apart, say, for example, one of the said magnets $b$ was located at $z'$; then, the motion of the controller would be retarded, as compared with the even motion given by the construction shown. This may be readily seen, by noting the lines of force, when the controller is in its midway position. If the field magnets be properly spaced, the lines of force from the controller magnets, will intersect the centers of the field magnets. If the field magnets be too close together, the axial lines of the controller magnets produced would overstep the face centers of the field magnets; and if the field magnets be too widely spaced, the said axial lines would not reach the faces of the magnets $b$.

By actual usage, I have demonstrated the practicability of the construction herein shown and described. The number of pairs of brushes $p^{12}$, will of course vary in number, according to the number of coupled series of armature magnets $g$. In respect to the relative positions of these pairs of brushes $p^{12}$, if the arc of the commutator segments or terminal pieces $p'$, be conceived as spaced off into subdivisions, one greater in number than the number of pairs of said brushes $p^{12}$; then, the said pairs of brushes, if properly positioned, will occupy the advance sub-divisions of the common arc of the said terminal pieces, as shown in Fig. 2. In other words, these pairs of brushes $p^{12}$ are spaced, one in advance of the other, within the arc of one of the segmental terminal pieces; and at such distances, that, under the rotary movement of the commutator, the current will be reversed through said pairs of brushes at equal intervals of succession or time phases.

It will, of course, be understood, that variations may be made in many of the details of construction, without departing from the spirit of my invention.

The particular insulations $p^2$ between the peripheral segments of the terminal pieces may contain metallic wearing surfaces $t$, as shown in Fig. 10 of the drawings.

Although the parts $r\ r'$ are, in fact a species of armature and might be called the pole changer armature, the term "magnetic controller" has been applied thereto, in order to better distinguish the same from the non-rotating armature $g\ g'$.

What I claim, and desire to secure by Letters Patent of the United States, is as follows:

1. The combination with a car, or other traveling body, of field magnets in the line of travel, a non-rotating armature on the car, electric connections for the field and armature magnets, and an automatic rotary pole changer carried by the car, located in the connections to the armature magnets and operated by the field magnets, substantially as described.

2. The combination with a car, or other traveling body, of the field magnets in the line of travel, a non-rotating armature on the car, and an automatic rotary pole changer carried by the car, consisting of a commutator in the connections to said armature magnet, and a rotary magnetic controller driving said commutator and operated by said field magnets, substantially as described.

3. The combination with a car, or other traveling body, of field magnets in the line of travel, the non-rotating armature on the car, the rotating pole changer, comprising the commutator in the connections to said armature magnets, and a magnetic controller carried on a common shaft with the said commutator, and operated by said field magnets, to drive the commutator, substantially as described.

4. The combination with the car, or other traveling body, of the field magnets in the line of travel, the non-rotating armature on the car, and the rotary pole changer on the car, consisting of the commutator in the connections to the armature magnets, and the rotary magnetic controller, for driving the commutator, having its magnets located at points in the arc of its periphery and subject to said field magnets, substantially as described.

5. The combination with the car, or other traveling body, of the field magnets in the line of travel, the adjacent members of which are excited with a constant and opposite polarity, the non-rotating armature on the car, the rotary pole changer on the car, consisting of the commutator in the connections to said armature magnets, and the magnetic controller driving the commutator, the adjacent magnets of which controller are excited with a constant and opposite polarity, and subject to said field magnets, substantially as described.

6. The combination with the car, of the field magnets in the line of travel, the non-rotating armature on the car, and the rotary pole changer on the car, consisting of the commutator, for alternating the currents through the armature magnets, and the magnetic controller, for driving the commutator, having radial magnets spaced apart at their outer ends distances less than the spans between the centers of adjacent field magnets, substantially as and for the purpose set forth.

7. The combination with the car or other traveling body, of the field magnets in the line of travel, the non-rotating armature on the car, the rotary pole changer on the car, consisting of a commutator in the connections to the armature magnets, for alternating the current through the same, and the magnetic controller, for driving the commutator, having radial magnets spaced apart at their outer ends distances less than the span between centers of adjacent field magnets, the said field and controller magnets, being so arranged that the axial lines of the controller magnets, produced, will, when the controller is midway between any pair of field magnets, intersect the face centers of said pair of field magnets, substantially as described.

8. The combination with the car, of the field magnets in the line of travel, the non-rotating armature on the car having its magnets connected up in several coupled series and the rotary commutator on the car, operated by said field magnets, having cooperating pairs of brushes, with connections to said several coupled series of armature magnets, arranged in advance of each other on the commutator, whereby the poles of said several coupled series of magnets will be reversed in succession, substantially as described.

9. The combination with the non-rotating armature, having the several coupled series of magnets, of the commutator having the double segmental pole pieces, the cooperating segments of which are in adjacent lateral arrangement, and the cooperating pairs of brushes, one pair for each of said coupled series of armature magnets, arranged in advance of each other within the arc of one segment of said pieces, substantially as and for the purpose set forth.

10. The rotary pole changer consisting of the magnetic controller, the commutator, the two pairs of contact disks, the common supporting shaft, circuit connections uniting the magnets of said controller with one of said pair of contact disks, connections uniting the other pair of said contact disks with the terminal plates of said commutator, and suitable insulations for all of said parts which require separation, substantially as described.

11. The commutator constructed of four interlocked double segment terminal pieces, carried by a common shaft, and provided with suitable insulations and circuit connection, the said terminal pieces being arranged to form two complete cylinders, the laterally adjacent segments of which are of opposite polarity, substantially as and for the purpose set forth.

12. The commutator constructed of four interlocked double segment pieces, carried by a common shaft, and provided with suitable insulations, the central members of which pieces have sleeve and socket engagement and contact with each other, and the outer members of which pieces are connected together and to the central members, by a yoke-bar carried by one of the outer members and connected by screws to the other outer member, said yoke-bar and screws being insulated from the central members, substantially as described.

13. The combination with the pole changer seat on the car, having circuit connection contacts for the storage battery and the armature magnets, of the rotary pole changer frame insertible in and removable from said seat, and provided with projecting spring contacts to the brushes, engageable and disengageable with said circuit connection contacts in said seat, by the insertion or removal of the pole changer frame, substantially as described.

In testimony whereof I affix my signature in presence of two witnesses.

PAUL W. LEFFLER.

Witnesses:
E. F. ELMORE,
FRANK D. MERCHANT.